United States Patent
Ambrus et al.

(10) Patent No.: US 12,008,818 B2
(45) Date of Patent: Jun. 11, 2024

(54) SYSTEMS AND METHODS TO TRAIN A PREDICTION SYSTEM FOR DEPTH PERCEPTION

(71) Applicant: Toyota Research Institute, Inc., Los Altos, CA (US)

(72) Inventors: Rares A. Ambrus, San Francisco, CA (US); Dennis Park, Fremont, CA (US); Vitor Guizilini, Santa Clara, CA (US); Jie Li, Los Altos, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 327 days.

(21) Appl. No.: 17/384,121

(22) Filed: Jul. 23, 2021

(65) Prior Publication Data
US 2022/0301203 A1 Sep. 22, 2022

Related U.S. Application Data

(60) Provisional application No. 63/161,735, filed on Mar. 16, 2021.

(51) Int. Cl.
*G06V 20/58* (2022.01)
*G01S 17/42* (2006.01)
(Continued)

(52) U.S. Cl.
CPC .............. *G06V 20/58* (2022.01); *G01S 17/42* (2013.01); *G01S 17/89* (2013.01); *G01S 17/931* (2020.01);
(Continued)

(58) Field of Classification Search
None
See application file for complete search history.

(56) References Cited

U.S. PATENT DOCUMENTS

| 4,693,378 A | * | 9/1987 | Azegami | B07C 5/10 209/939 |
| 9,598,015 B1 | * | 3/2017 | Pertsel | G06V 20/597 |

(Continued)

FOREIGN PATENT DOCUMENTS

WO 2020188120 A1 9/2020

OTHER PUBLICATIONS

Hariharan, Bharath, et al. "Simultaneous detection and segmentation." Computer Vision—ECCV 2014: 13th European Conference, Zurich, Switzerland, Sep. 6-12, 2014, Proceedings, Part VII 13. Springer International Publishing, 2014. (Year: 2014).*

(Continued)

*Primary Examiner* — Michelle M Entezari Hausmann
(74) *Attorney, Agent, or Firm* — Christopher G. Darrow; Darrow Mustafa PC (57) ABSTRACT

System, methods, and other embodiments described herein relate to a manner of training a depth prediction system using bounding boxes. In one embodiment, a method includes segmenting an image to mask areas beyond bounding boxes and identify unmasked areas within the bounding boxes. The method also includes training a depth model using depth losses from comparing weighted points associated with pixels of the image within the unmasked areas to ground-truth depth. The method also includes providing the depth model for object detection.

20 Claims, 5 Drawing Sheets

(51) Int. Cl.
| | |
|---|---|
| G01S 17/89 | (2020.01) |
| G01S 17/931 | (2020.01) |
| G06F 18/21 | (2023.01) |
| G06F 18/2113 | (2023.01) |
| G06F 18/214 | (2023.01) |
| G06F 18/25 | (2023.01) |
| G06N 3/04 | (2023.01) |
| G06N 3/08 | (2023.01) |
| G06N 20/00 | (2019.01) |
| G06T 7/10 | (2017.01) |
| G06T 7/11 | (2017.01) |
| G06T 7/50 | (2017.01) |
| G06V 10/46 | (2022.01) |
| G06V 10/75 | (2022.01) |
| G06V 20/56 | (2022.01) |

(52) U.S. Cl.
CPC ...... *G06F 18/2113* (2023.01); *G06F 18/2155* (2023.01); *G06F 18/217* (2023.01); *G06F 18/251* (2023.01); *G06N 3/04* (2013.01); *G06N 3/08* (2013.01); *G06N 20/00* (2019.01); *G06T 7/10* (2017.01); *G06T 7/11* (2017.01); *G06T 7/50* (2017.01); *G06V 10/462* (2022.01); *G06V 10/757* (2022.01); *G06V 20/56* (2022.01); *G06T 2207/10024* (2013.01); *G06T 2207/10028* (2013.01); *G06T 2207/20016* (2013.01); *G06T 2207/20081* (2013.01); *G06T 2207/20084* (2013.01); *G06T 2207/30248* (2013.01)

(56) References Cited

U.S. PATENT DOCUMENTS

| | | | | |
|---|---|---|---|---|
| 10,999,559 | B1* | 5/2021 | Pertsel | B60R 1/26 |
| 2017/0161581 | A1* | 6/2017 | Kozitsky | G06V 20/63 |
| 2018/0220061 | A1* | 8/2018 | Wang | G06N 3/02 |
| 2020/0349246 | A1 | 11/2020 | Budman et al. | |
| 2021/0072397 | A1 | 3/2021 | Caspers et al. | |
| 2022/0196395 | A1* | 6/2022 | Maehnert | B60D 1/62 |
| 2022/0284613 | A1* | 9/2022 | Yin | G06T 7/30 |
| 2022/0308592 | A1* | 9/2022 | Go | G05D 1/0214 |

OTHER PUBLICATIONS https://en.wikipedia.org/wiki/Stochastic_gradient_descent (Year: 2004).*
Peng, Wanli, et al. "Ida-3d: Instance-depth-aware 3d object detection from stereo vision for autonomous driving." Proceedings of the IEEE/CVF Conference on Computer Vision and Pattern Recognition. 2020. (Year: 2020).*
Wang, Yan, et al. "Pseudo-lidar from visual depth estimation: Bridging the gap in 3d object detection for autonomous driving." Proceedings of the IEEE/CVF Conference on Computer Vision and Pattern Recognition. 2019. (Year: 2019).*
Guizilini et al., "Robust Semi-Supervised Monocular Depth Estimation with Reprojected Distances," In Conference on Robot Learning (CoRL), Oct. 2019, pp. 1-10.
Eigen et al., "Depth Map Prediction from a Single Image using a Multi-Scale Deep Network," In Advances in neural information processing systems, 2014, pp. 2366-2374.
Lee et al., "From Big to Small: Multi-Scale Local Planar Guidance for Monocular Depth Estimation," arXiv:1907.10326, 2019, pp. 1-11.
Fu et al., "Deep Ordinal Regression Network for Monocular Depth Estimation," In Proceedings of the IEEE Conference on Computer Vision and Pattern Recognition, 2018, pp. 2002-2011.
Weng et al., "Monocular 3D Object Detection with Pseudo-LiDAR Point Cloud," In Proceedings of the IEEE/CVF International Conference on Computer Vision, 2019, pp. 1-14.
You et al., "Pseudo-LiDAR++: Accurate Depth for 3D Object Detection in Autonomous Driving," ICLR, 2020, pp. 1-22.
Simonelli et al., "Demystifying Pseudo-LiDAR for Monocular 3D Object Detection," arXiv:2012.05796v1, Dec. 10, 2020, pp. 1-12.
Ma et al., "Rethinking Pseudo-LiDAR Representation," Computer Vision—ECCV 2020, Lecture Notes in Computer Science, vol. 123582020, pp. 311-327.
Zhou et al., "Objects as points," arXiv:1904.07850, 2019, pp. 1-12.
Tang et al., "Transferable Semi-Supervised 3D Object Detection From RGB-D Data," Proceedings of the IEEE/CVF International Conference on Computer Vision (ICCV), 2019, pp. 1931-1940.
Chen et al., "RolFusion: 3D Object Detection from LiDAR and Vision," in IEEE Access, vol. 9, 2021, pp. 51710-51721.
Choi et al., "SelfDeco: Self-Supervised Monocular Depth Completion in Challenging Indoor Environments," arXiv:2011.04977, Nov. 10, 2020, pp. 1-8.
Klingner et al., "Self-Supervised Monocular Depth Estimation: Solving the Dynamic Object Problem by Semantic Guidance," ECCV 2020, vol. 12365, pp. 582-600.
Choi et al., "SAFENet: Self-Supervised Monocular Depth Estimation with Semantic-Aware Feature Extraction," NeurIPS 2020, pp. 1-17.
Koestler et al., "Learning Monocular 3D Vehicle Detection without 3D Bounding Box Labels," arXiv:2010.03506, Oct. 7, 2020, pp. 1-15.
Anton Eklund, "Cascade Mask R-CNN and Keypoint Detection used in Floorplan Parsing," 2020, 44 pages.

* cited by examiner

SYSTEMS AND METHODS TO TRAIN A PREDICTION SYSTEM FOR DEPTH PERCEPTION

CROSS-REFERENCE TO RELATED APPLICATIONS

This application claims benefit of U.S. Provisional Application No. 63/161,735, filed on, Mar. 16, 2021, which is herein incorporated by reference in its entirety.

TECHNICAL FIELD

The subject matter described herein relates, in general, to training a prediction system, and, more particularly, to training a depth prediction model using bounding boxes and masking.

BACKGROUND

Various devices that operate autonomously or that otherwise function to perceive aspects about a surrounding environment often use sensors that facilitate perceiving objects and additional aspects of the environment. The ability to reconstruct the structure of a scene with high accuracy is important for awareness and navigation of the scene. As one example, a robotic device (e.g., vehicle) uses information from the sensors to facilitate awareness of the surrounding environment in order to avoid obstacles when navigating. In particular, the robotic device uses the perceived information to determine a three-dimensional structure of the environment so that the device may distinguish between navigable regions and the potential obstacles.

In one approach, the robotic device may employ monocular cameras to capture images of the surrounding environment to estimate features of the scene. In various implementations, a system using a monocular camera may rely on machine learning (ML) models for estimating object depth and detecting objects within the images. For example, a system may train an ML model in a pseudo-lidar (PL) architecture to generate a point cloud according to object depth predicted from the images for perception and navigation. However, a system that trains an ML model for depth estimation may encounter difficulties with accurately weighting object sizes within the point cloud. For instance, the system may equally treat object points in the foreground similar to those within the background even if salient objects of the scene are in the foreground. Accordingly, a robotic device using the ML model may compute erroneous depth estimates in a scene having diverse objects due to particular weighting of depth points during training.

SUMMARY

In one embodiment, example systems and methods relate to a manner of training a depth prediction system using bounding boxes to selectively mask areas of an image. In various implementations, a system training a machine learning (ML) model to predict depth from monocular camera images may experience difficulties due to different object sizes in a scene. For example, the system may be trained such that a building is more pronounced over a pedestrian because the building occupies more pixels in an image. As such, the system may over-weight the building depth for training instead of the pedestrian, thereby potentially increasing collisions by a robotic device (e.g., vehicle) during ML implementations. Therefore, in one embodiment, a prediction system is trained by masking areas outside of bounding boxes for objects within an image, such as those from a monocular camera. After masking, the unmasked areas may be associated with the bounding boxes that include relevant objects in a scene. As such, training using masks may focus depth estimation on objects within the bounding boxes, thereby improving object detection in a pipeline and associated functions (e.g., collision avoidance) during implementation.

In one approach, the prediction system may train a depth model using depth losses by weighting depth points within the unmasked areas. The weighted depth points may be associated with pixels or areas that are compared to ground truths of the scene for computing the depth losses. In various implementations, the prediction system may also train the depth model using various functions for over-weighting points according to system applications. For example, the prediction system may weigh depth points according to a center of a bounding box for a city environment or a probabilistic distribution for a rural environment. In this way, the prediction system trains the depth model by adapting weights for depth estimates to improve objection detection, thereby improving related applications (e.g., navigation).

In one embodiment, a prediction system for training a depth model is disclosed. The prediction system includes a processor and a memory storing instructions that, when executed by the processor, cause the processor to segment an image to mask areas beyond bounding boxes and identify unmasked areas within the bounding boxes. The instructions also include instructions to train the depth model using depth losses from comparing weighted points associated with pixels of the image within the unmasked areas to ground-truth depth. The instructions also include instructions to provide the depth model for object detection.

In one embodiment, a non-transitory computer-readable medium for training a depth model and including instructions that, when executed by a processor, cause the processor to perform one or more functions is disclosed. The instructions include instructions to segment an image to mask areas beyond bounding boxes and identify unmasked areas within the bounding boxes. The instructions also include instructions to train the depth model using depth losses from comparing weighted points associated with pixels of the image within the unmasked areas to ground-truth depth. The instructions also include instructions to provide the depth model for object detection.

In one embodiment, a method for training a depth prediction system using bounding boxes is disclosed. In one embodiment, the method includes segmenting an image to mask areas beyond bounding boxes and identify unmasked areas within the bounding boxes. The method also includes training a depth model using depth losses from comparing weighted points associated with pixels of the image within the unmasked areas to ground-truth depth. The method also includes providing the depth model for object detection.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with training a depth prediction system using bounding boxes to selectively mask areas of an image are disclosed herein. A prediction system improves training by avoiding equal weighting of depth points for loss calculations on image areas. Prior to weighting, the prediction system may use a detector to generate a view with bounding boxes in unmasked areas having points-of-interest while masking other areas. In one approach, points-of-interest may represent areas having objects at a certain range or pixel density.

Upon completion of masking, the prediction system may train a depth model by computing losses for estimated depth points within unmasked areas using ground truths. In particular, training may involve decaying or ranking losses of depth points thereby guiding the training to the points-of-interest. For example, the prediction system may use a Gaussian point distribution to adaptively decay losses from depth points on objects within unmasked bounding boxes. The prediction system may decay losses, in various implementations, according to distance from the center of bounding boxes.

In addition to decaying, the prediction system may also rank unmasked depth points. In one approach, the prediction system ranks according to a radial penalty using a Gaussian distribution that gradually penalizes localization errors. For instance, the prediction system may penalize erroneous points for an object center less than predicting an error. This approach may result in smoother depth maps during inference. To complete training, the prediction system may continue loss calculations until criteria are met for convergence. For example, the criteria may be that losses of depth points within a certain radial distance of bounding boxes are below a threshold. In this way, the prediction system may improve depth perception and subsequent 3D object detection by adaptively focusing the training on losses near the salient objects in a scene, thereby improving applications that rely on depth maps.

Figure 1:
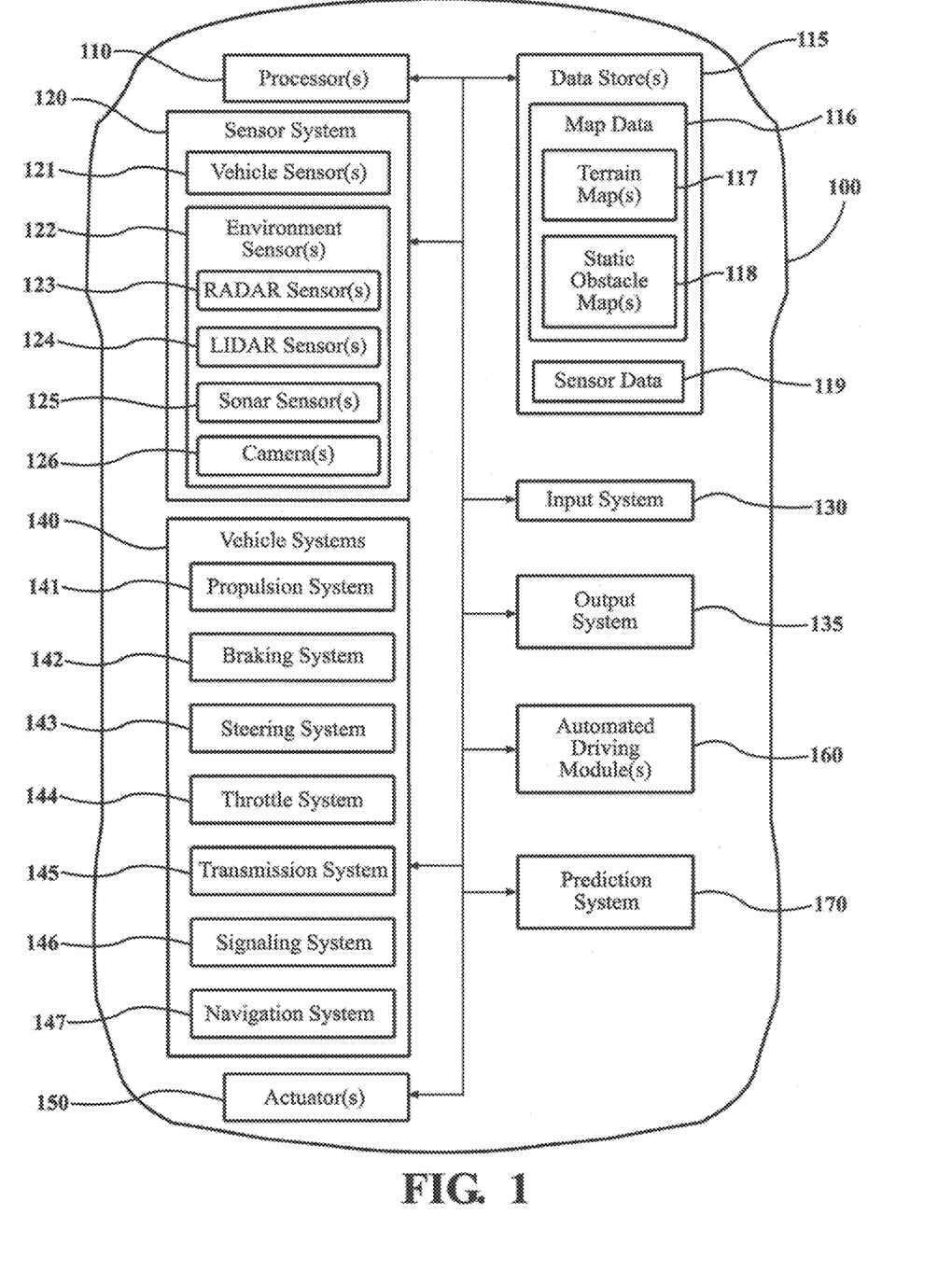
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the prediction system 170 may be used for consumer electronics (CE), mobile devices, robotic devices, drones, and so on. In other implementations, the vehicle 100 may be any robotic device or form of motorized transport that, for example, includes sensors to perceive aspects of the surrounding environment, and thus benefits from the functionality discussed herein associated with training a depth prediction system using bounding boxes to selectively mask areas of an image.

The vehicle 100 also includes various elements. It will be understood that in various embodiments, the vehicle 100 may have less than the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. In addition, in one approach, functionality associated with at least one module of the prediction system 170 is implemented within the vehicle 100 while further functionality is implemented within a cloud-based computing system associated with training a depth model.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a prediction system 170 that is implemented to perform methods and other functions as disclosed herein related to training using bounding boxes to selectively mask areas of an image.

Figure 2:
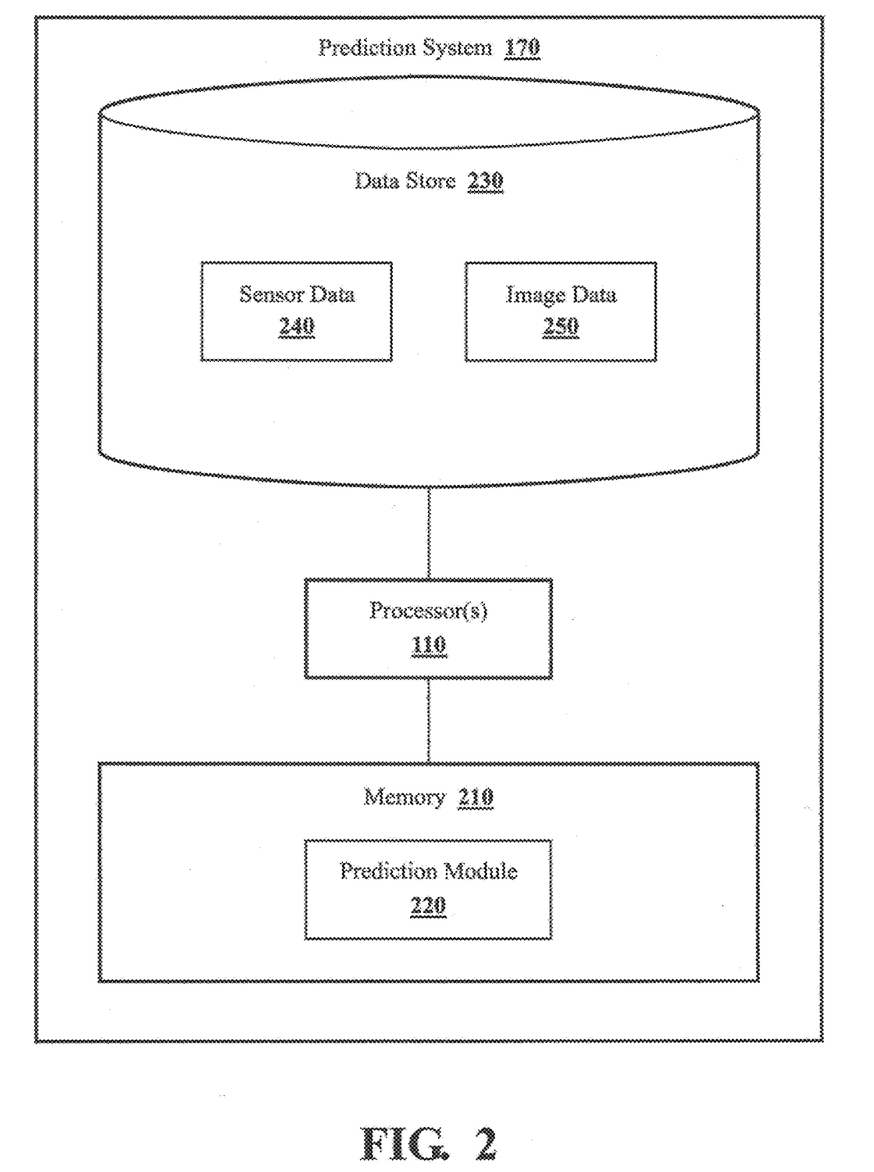
FIG. 2 illustrates one embodiment of a prediction system that is trained for depth perception using bounding boxes to selectively mask areas of an image.

With reference to FIG. 2, one embodiment of the prediction system 170 of FIG. 1 is further illustrated. The prediction system 170 is shown as including a processor(s) 110 from the vehicle 100 of FIG. 1. Accordingly, the processor(s) 110 may be a part of the prediction system 170, the prediction system 170 may include a separate processor from the processor(s) 110 of the vehicle 100, or the prediction system 170 may access the processor(s) 110 through a data bus or another communication path. In one embodiment, the prediction system 170 includes a memory 210 that stores a prediction module 220. The memory 210 is a random-access memory (RAM), read-only memory (ROM), a hard-disk drive, a flash memory, or other suitable memory for storing the prediction module 220. The prediction module 220 is, for example, computer-readable instructions that when executed by the processor(s) 110 cause the processor(s) 110 to perform the various functions disclosed herein.

Moreover, the prediction system 170 as illustrated in FIG. 2 is generally an abstracted form of the prediction system 170 as may be implemented, for example, between the vehicle 100 and a cloud-computing environment. As such, the prediction module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the prediction module 220, in one embodiment, acquires sensor data 240 that includes at least camera images for depth perception.

Accordingly, the prediction module 220, in one embodiment, controls the respective sensors to provide the data inputs in the form of the sensor data 240. Additionally, while the prediction module 220 is discussed as controlling the various sensors to provide the sensor data 240, in one or more embodiments, the prediction module 220 can employ other techniques to acquire the sensor data 240 that are either active or passive. For example, the prediction module 220 can undertake various approaches to fuse data from multiple sensors when providing the sensor data 240 and/or from sensor data acquired over a wireless communication link. Thus, the sensor data 240, in one embodiment, may represent a combination of perceptions acquired from multiple sensors.

Moreover, in one embodiment, the prediction system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the prediction module 220 in executing various functions. In one embodiment, the data store 230 includes the sensor data 240 along with, for example, metadata that characterize various aspects of the sensor data 240. In one embodiment, the data store 230 further includes the image data 250. For example, the image data 250 may be associated with images captured by a monocular cameras(s) on the vehicle 100.

Figure 3:
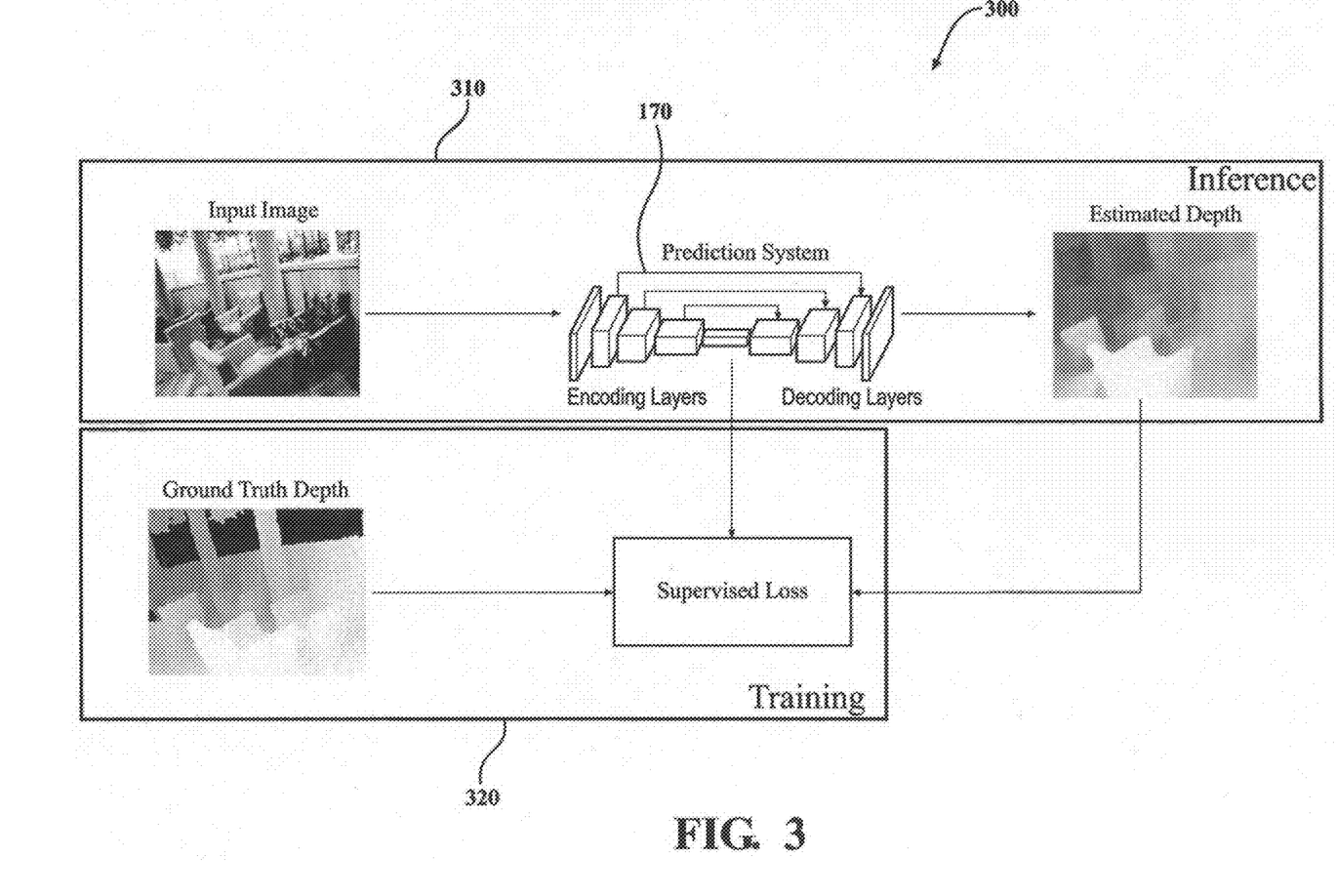
FIG. 3 is an example of an architecture for training the prediction system of FIG. 2 according to unmasked areas within an image.

The prediction module 220, in one embodiment, is further configured to perform additional tasks beyond controlling the respective sensors to acquire and provide the sensor data 240. For example, the prediction module 220 includes instructions that cause the processor(s) 110 to train the prediction system 170 using masking such that depth estimates concentrate on relevant points-of-interest or focal points within a scene. For example, the vehicle 100 implementing the prediction system 170 may find the depth associated with other vehicles more relevant than the road for automated driving. As such, the prediction system 170 may perform training on a subset of estimated depth points associated with pixels using masking. This approach may discriminate losses between a subset of focal points from other areas to improve training performance. FIG. 3 is an example of an architecture 300 for training the prediction system 170 of FIG. 2 by discriminating losses between masked and unmasked areas of an image.

In FIG. 3, an inference component 310 may include the prediction system 170 that estimates depth for an input image and trains according to unmasked areas. In various implementations, the prediction may perform supervised training to improve monocular depth estimates between far objects (e.g., 30 m-40 m) and near objects (e.g., 5 m) by adapting focal or depth losses, such as according to pixel density. Regarding implementations, the inference component 310 may estimate distances to pixels in an image for generating a point cloud around potential objects in a scene. For example, a point cloud may be similar to representations generated by light detection and ranging (LIDAR) systems to estimate depth. The point cloud may be produced using simpler hardware and a depth model that reduces processing while maintaining accuracy. Consequently, a three-dimensional (3D) detection network may utilize the output of the inference component 310 to determine the position, orientation, or class of objects in a 3D scene.

Furthermore, the inference component 310 training may be performed on a cloud server, edge server, and so on. For the initial training data, the input image may be a red/green/blue (RGB) image similar to that taken by a monocular camera for the prediction system 170 for generating a depth map without relying on LIDAR. A depth map comprises grey-scale pixels where the intensity of each pixel represents the distance between an object and an image sensor or camera. For comparing the depth map, the training component 320 may compute a supervised loss using a target dataset having ground-truth depth and fine-tune weights of the prediction system 170 accordingly. For example, the supervised loss may be the differences between the estimated depth and ground-truth depth for unmasked areas.

As mentioned above, the prediction system 170 may utilize masking to improve supervised training and subsequent tasks for 3D object detection. As such, a bounding box detector, such as a two-dimensional (2D) detector (e.g., OpenCV), may mask a scene to focus training on a certain feature or focal points within a scene. For instance, the masking may facilitate weighting or scaling losses more in the foreground than those in the background. This may improve supervised training by avoiding equal weighting of objects in the scene. In other words, the vehicle 100 may find the objects in the foreground (e.g., pedestrians, vehicles, etc.) more relevant than objects in the background (e.g., buildings) during automated mode. As such, the prediction system 170 may effectively guide losses to relevant points-of-interest for improving supervised training and thereby depth perception by avoiding equal or erroneous weighting.

In various implementations, the prediction system 170 may use a network model to weigh or emphasize estimated depth points on objects in a scene. For example, the prediction system 170 may use a kernel function such as a linear kernel, a Gaussian kernel, a polynomial kernel, and so on processed according to a kernel method. A kernel may be a user-defined similarity function over pairs of data points in a raw representation. Accordingly, the kernel method may operate in a high-dimensional, implicit feature space without computing the coordinates of the data in that space. In this way, prediction system 170 using a kernel method may distinguish features of the unmasked areas with less computational cost.

For kernel-based implementations, the prediction system 170 may use a Gaussian kernel to adaptively decay or rank depth points on objects within unmasked bounding boxes. For example, the prediction system 170 may decay loss contributions from pixels relative to the center of a bounding box for an image taken by a monocular camera. In one approach, the decay may be exponential, polynomial, and so on according to object placement or features within a scene. As such, the prediction system 170 may train a depth model according to depth points with less decay in unmasked areas at various rates.

Similarly, the prediction system 170 may rank depth points that are unmasked according to a radial penalty using a Gaussian distribution for loss calculations. In one approach, the ranking may emulate semantic or interest keypoint processing for objects within an image. Semantic keypoints relate to points-of-interest with semantic meaning for objects, such as a right eye corner, right tire of the vehicle 100, and so on. Interest points may relate to low-level points without a clear semantic meaning, such as an endpoint of a line segment. As such, the prediction system 170 may emphasize object centers in unmasked areas while gradually penalizing localization errors according to a distribution for keypoint processing. For instance, the prediction system 170 may penalize an object center off by one pixel less than other pixel errors for smoother estimation during inference. In one approach, the prediction system 170 may also train the depth model by ranking depth points according to potential object sizes for increased depth balance. For example, objects with higher pixel counts, relative to other objects in the middle-ground of an image, may be over-weighted by the prediction system 170. Accordingly, the prediction system 170 may find certain focal points of the objects within the image according to the adaptive weighting of depth points.

In addition, the prediction system 170 may perform training using losses between estimated depth points on overlapping bounding boxes by ranking higher depth points in unmasked areas with multiple objects. For example, the prediction system 170 may over-weight overlapping depth points in the middle-ground over single object depth points in the foreground. Regarding machine learning (ML) implementations, detecting a cluster of objects through over-weighting of depth points may assist the vehicle 100 to avoid potentially dangerous areas during automated driving. Accordingly, a system using the prediction system 170 for 3D detection may more readily detect multiple objects through adaptive weighting of depth points.

Figure 4:
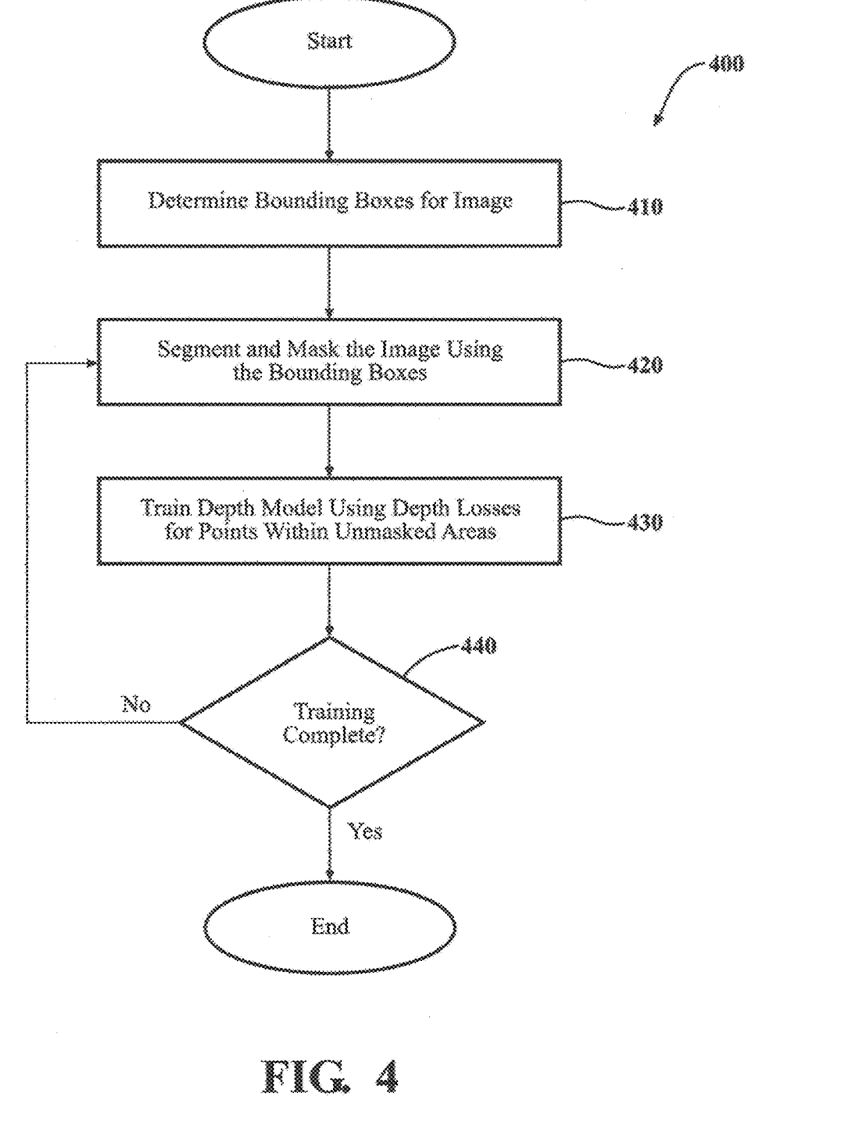
FIG. 4 illustrates one embodiment of a method that is associated with training a depth prediction model using bounding boxes to selectively mask areas of an image.

Additional aspects of the prediction system 170 and loss weighting for training will be discussed in relation to FIG. 4. FIG. 4 illustrates a flowchart of a method 400 that is associated with training a depth prediction model using bounding boxes to selectively mask areas of an image. Method 400 will be discussed from the perspective of the prediction system 170 of FIGS. 1, and 2. While method 400 is discussed in combination with the prediction system 170, it should be appreciated that the method 400 is not limited to being implemented within the prediction system 170 but is instead one example of a system that may implement the method 400. Furthermore, in one approach, the training may be performed on a cloud server, edge server, and so on instead of the vehicle 100 to leverage computing resources for efficient training.

At 410, the prediction system 170 determines bounding boxes for an image using data acquired by the vehicle 100. For example, the prediction system 170 may use a detector or computer vision module to determine the bounding boxes. In one approach, a computer vision module can draw bounding boxes for objects within an image according to pixel information representing different image areas.

At 420, the prediction system 170 segments and masks the image using the bounding boxes. The image may be an RGB image or an image similar to that taken from a monocular camera. A 2D detector (e.g., OpenCV) may generate a view with bounding boxes in unmasked areas having points-of-interest while masking other areas. As such, the prediction system 170 may perform training on a subset of estimated depth points associated with pixels in an image using masking. In this way, the system may discriminate losses between the subset having relevant points-of-interest and other depth points. Emphasizing the subset may allow the prediction system 170 to focus on objects according to the range or pixel density. For example, the prediction system 170 may perform training to improve monocular depth estimates between far objects (e.g., 30 m-40 m) and near objects (e.g., 5 m) by adapting focal or depth losses.

After masking, at 430 the prediction system 170 trains a depth model using losses for estimated depth points within unmasked areas. The depth points may be associated with pixels of the image, such as in a depth map. In various implementations, a depth map may comprise grey-scale pixels where the intensity of each pixel represents the distance between an object and an image sensor or camera. Furthermore, as explained above and illustrated below, the prediction system 170 may perform training by decaying or ranking losses of depth points thereby guiding the training to relevant points-of-interest about an image. For example, applying a Gaussian kernel to the masked image may adaptively decay depth points or rank depth points on objects within unmasked bounding boxes. In one approach, the decaying loss contribution is performed from pixels substantially in the center of a bounding box by following a Gaussian distribution.

Moreover, the prediction system 170 may rank unmasked depth points according to a radial penalty using a Gaussian distribution to penalize localization errors gradually for smoother estimation. For instance, the prediction system 170 may penalize an object center erroneously by one pixel than other prediction errors. Similarly, the prediction system 170 may perform training using losses between predicted depth points on overlapping bounding boxes by ranking points higher in unmasked areas with multiple objects. In this way, the prediction system 170 may improve depth perception and subsequent 3D object detection by focusing the training on losses near the relevant objects or points in a scene thereby improving depth maps.

The training continues at 440 until criteria are met for convergence of the prediction system 170. For example, the criteria may be that losses of depth points within a certain radial distance of bounding boxes are below a threshold. In one approach, the prediction system 170 may continue training until the weights of the depth model reach a stable level for the network. Upon training completion, the prediction system 170 may be downloaded to a robotic device, vehicle, consumer device, and so on to generate depth maps for subsequent tasks (e.g., detect objects).

Figure 5:
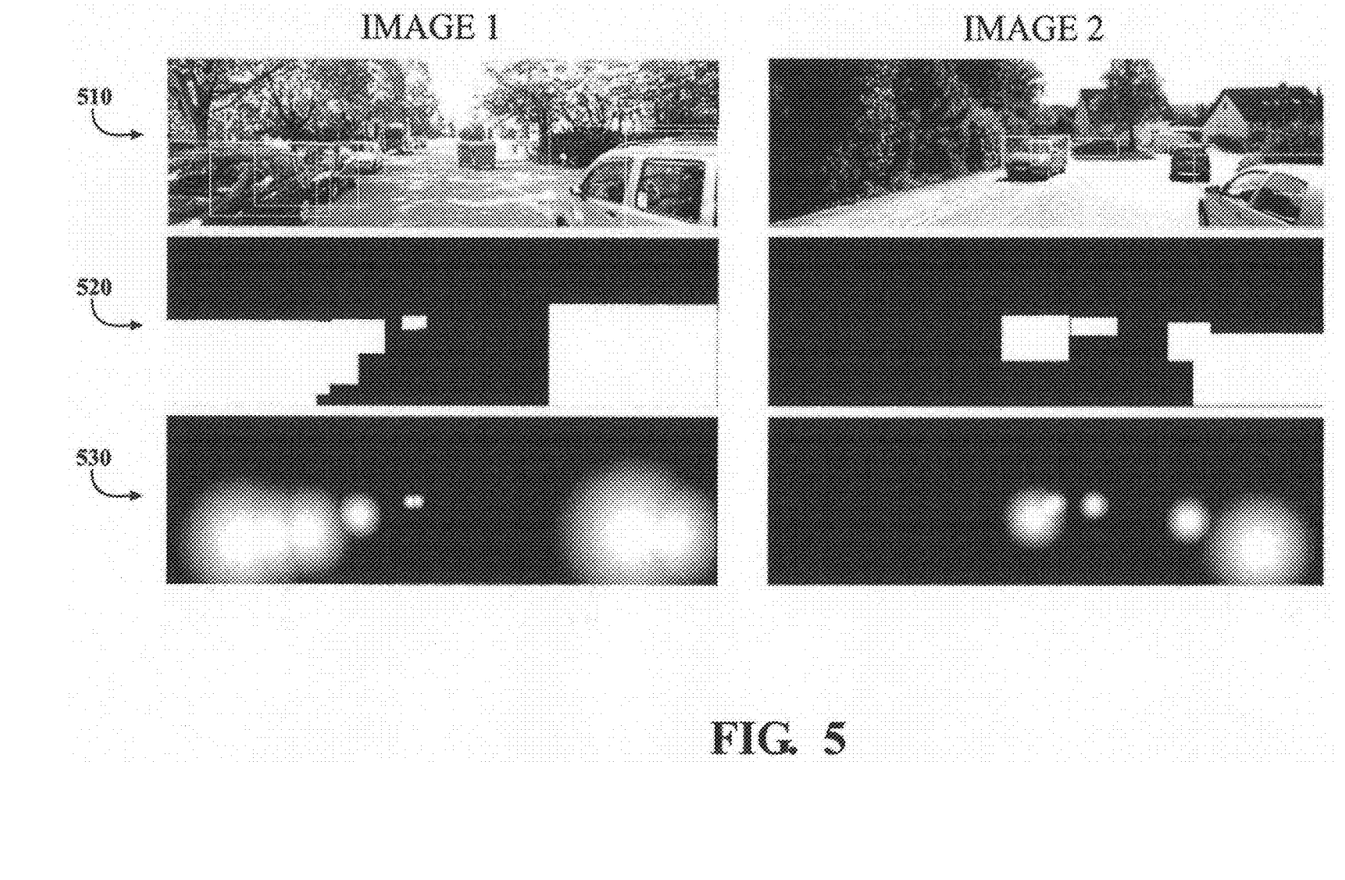
FIG. 5 shows examples of scenes using bounding boxes for selective masking and pixel decay on an image for training a prediction system.

To illustrate the masking and weighting by the prediction system 170, examples of scenes using bounding boxes for selective masking and pixel decay for training are given in FIG. 5. In 510, input RGB images 1 and 2 have bounding boxes around potential objects in a scene. As explained above, in 520 the prediction system 170 may mask the image using a 2D detector (e.g., OpenCV) to consider depth points that are within or proximate to bounding boxes. In 530, the prediction system 170 may then weigh losses for certain points according to a Gaussian distribution and supervised training. For example, black pixels may represent zero contribution to the loss while white pixels have the maximum contribution. In one approach, pixels of objects that overlap in image 1 may be over-weighted over other white pixels for identifying relevant points-of-interest. Furthermore, using a Gaussian distribution may avoid equal weighting of objects at different depths, such as objects in the foreground, middle-ground, and background. In this way, the prediction system 170 trains according to scene context through masking and weighting to properly weigh objects at various depths for loss calculations. Correspondingly, a depth model may improve estimating object depth in a scene having roads and buildings that occupy significant pixels through balanced supervised training.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), and an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (WILT), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the prediction system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110, the prediction system 170, and/or the automated driving module(s) 160 may control some or all of the vehicle systems 140 and, thus, may be partially or fully autonomous as defined by the society of automotive engineers (SAE) levels 0 to 5.

The processor(s) 110, the prediction system 170, and/or the automated driving module(s) 160 can be operatively connected to communicate with the various vehicle systems 140 and/or individual components thereof. For example, returning to FIG. 1, the processor(s) 110, the prediction system 170, and/or the automated driving module(s) 160 can be in communication to send and/or receive information from the various vehicle systems 140 to control the movement of the vehicle 100. The processor(s) 110, the prediction system 170, and/or the automated driving module(s) 160 may control some or all of the vehicle systems 140.

The processor(s) 110, the prediction system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the prediction system 170, and/or the automated driving module(s) 160 can control the direction and/or speed of the vehicle 100. The processor(s) 110, the prediction system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuator(s) 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the prediction system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 240. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A prediction system for training a depth model, comprising:
   a processor; and
   a memory storing instructions that, when executed by the processor, cause the processor to:
   segment an image to mask areas beyond bounding boxes and identify unmasked areas within the bounding boxes;
   train the depth model using depth losses from comparing weighted points associated with ranked pixels and a size of objects associated with a pixel count within the unmasked areas to ground-truth depth; and
   provide the depth model for object detection.

2. The prediction system of claim 1, wherein the instructions to train the depth model further include instructions to calculate the depth losses by adaptively decaying the ranked pixels relative to centers of the bounding boxes and selecting the weighted points according to the decaying.

3. The prediction system of claim 1, wherein the instructions to train the depth model further include instructions to calculate the depth losses for the ranked pixels within the bounding boxes according to a statistical distribution for selecting the weighted points.

4. The prediction system of claim 1, wherein the weighted points are over-weighted for the ranked pixels that overlap between the bounding boxes and the bounding boxes represent the objects identified within the image.

5. The prediction system of claim 1, wherein the instructions to train the depth model further include instructions to calculate the depth losses by selecting the weighted points according to the size identified within the unmasked areas.

6. The prediction system of claim 1, wherein the weighted points are proximate to focal points of the objects within the unmasked areas.

7. The prediction system of claim 1, wherein the bounding boxes are locations within the image having the objects in a scene and the weighted points are associated with a point cloud generated from the image.

8. A non-transitory computer-readable medium for training a depth model including instructions that, when executed by a processor, cause the processor to:
   segment an image to mask areas beyond bounding boxes and identify unmasked areas within the bounding boxes;
   train the depth model using depth losses from comparing weighted points associated with ranked pixels and a size of objects associated with a pixel count within the unmasked areas to ground-truth depth; and
   provide the depth model for object detection.

9. The non-transitory computer-readable medium of claim 8, wherein the instructions to train the depth model further include instructions to calculate the depth losses by adaptively decaying the ranked pixels relative to centers of the bounding boxes and selecting the weighted points according to the decaying.

10. The non-transitory computer-readable medium of claim 8, wherein the instructions to train the depth model further include instructions to calculate the depth losses the ranked pixels within the bounding boxes according to a statistical distribution for selecting the weighted points.

11. The non-transitory computer-readable medium of claim 8, wherein the weighted points are over-weighted for the ranked pixels that overlap between the bounding boxes and the bounding boxes represent the objects identified within the image.

12. The non-transitory computer-readable medium of claim 8, wherein the instructions to train the depth model further include instructions to calculate the depth losses by selecting the weighted points according to the sizes identified within the unmasked areas.

13. The non-transitory computer-readable medium of claim 8, wherein the weighted points are proximate to focal points of the objects within the unmasked areas.

14. A method, comprising:
   segmenting an image to mask areas beyond bounding boxes and identify unmasked areas within the bounding boxes;
   training a depth model using depth losses from comparing weighted points associated with ranked pixels and a size of objects associated with a pixel count within the unmasked areas to ground-truth depth; and
   providing the depth model for object detection.

15. The method of claim 14, wherein training the depth model further includes calculating the depth losses by adaptively decaying the ranked pixels relative to centers of the bounding boxes and selecting the weighted points according to the decaying.

16. The method of claim 14, wherein training the depth model further includes calculating the depth losses for the ranked pixels within the bounding boxes according to a statistical distribution for selecting the weighted points.

17. The method of claim 14, wherein the weighted points are over-weighted for the ranked pixels that overlap between the bounding boxes and the bounding boxes represent the objects identified within the image.

18. The method of claim 14, wherein training the depth model further includes calculating the depth losses by selecting the weighted points according to the size identified within the unmasked areas.

19. The method of claim 14, wherein the weighted points are proximate to focal points of the objects within the unmasked areas.

20. The method of claim 14, wherein the bounding boxes are locations within the image having the objects in a scene and the weighted points are associated with a point cloud generated from the image.

\* \* \* \* \*

UNITED STATES PATENT AND TRADEMARK OFFICE
CERTIFICATE OF CORRECTION

PATENT NO. : 12,008,818 B2
APPLICATION NO. : 17/384121
DATED : June 11, 2024
INVENTOR(S) : Rares A. Ambrus et al.

It is certified that error appears in the above-identified patent and that said Letters Patent is hereby corrected as shown below:

In the Specification

Column 11, Line 4, change "WILT" to "IMU".

In the Claims

Column 16, Claim 12, Line 49, change "sizes" to "size".

Signed and Sealed this
Ninth Day of July, 2024

Katherine Kelly Vidal
*Director of the United States Patent and Trademark Office*